United States Patent [19]
Greenberger et al.

[11] Patent Number: 5,802,382
[45] Date of Patent: Sep. 1, 1998

[54] FLEXIBLE SINGLE CHIP DIGITAL PROCESSOR ARCHITECTURE

[75] Inventors: Alan Joel Greenberger, South Whitehall Township, Lehigh County; Lawrence Allen Rigge, Emmaus; Mark Ernest Thierbach, South Whitehall Township, Lehigh County, all of Pa.

[73] Assignee: Lucent Technologies Inc., Murray Hill, N.J.

[21] Appl. No.: 415,098

[22] Filed: Mar. 31, 1995

Related U.S. Application Data

[63] Continuation of Ser. No. 651,067, Feb. 5, 1991, abandoned.
[51] Int. Cl.$^6$ .................... G06F 9/44; G06F 13/38
[52] U.S. Cl. .............. 395/800; 395/892; 395/894; 364/DIG. 1; 364/DIG. 2
[58] Field of Search .............. 395/800, 395, 395/500, 446, 879, 200.2, 558, 564, 678, 570, 842, 892, 250; 364/DIG. 1, DIG. 2, 757, 736, 915.01, 748, 765, 423.098; 348/384, 441; 365/189.01, 189

[56] References Cited

U.S. PATENT DOCUMENTS

| | | | |
|---|---|---|---|
| 3,579,201 | 5/1971 | Langley | 375/775 |
| 3,986,170 | 10/1976 | Valassis et al. | 395/735 |
| 4,093,993 | 6/1978 | Sato | 364/712 |
| 4,096,566 | 6/1978 | Borie et al. | 395/306 |
| 4,224,676 | 9/1980 | Appelt | 364/712 |
| 4,393,468 | 7/1983 | New | 364/736 |
| 4,442,498 | 4/1984 | Rosen | 364/745 |
| 4,467,444 | 8/1984 | Harmon, Jr. et al. | 395/375 |
| 4,641,247 | 2/1987 | Langesen et al. | 364/490 |
| 4,718,057 | 1/1988 | Venkitakrishnan | 370/55 |
| 4,760,517 | 7/1988 | Miller et al. | 395/800 |
| 4,811,269 | 3/1989 | Hirose et al. | 364/754 |
| 4,901,267 | 2/1990 | Birman et al. | 364/436 |
| 4,935,867 | 6/1990 | Wang et al. | 395/400 |
| 4,947,357 | 8/1990 | Stewart et al. | 364/490 |
| 5,056,015 | 10/1991 | Baldwin et al. | 395/500 |
| 5,072,418 | 12/1991 | Boutand et al. | 364/715.06 |
| 5,123,108 | 6/1992 | Olson et al. | 395/800 |
| 5,134,487 | 7/1992 | Taguchi et al. | 348/384 |

OTHER PUBLICATIONS

"Multiprocessor Configurations for the 8086", *The 8086 Book*, Russell Rector, George Alexy, Osborne/McGraw–Hill, Berkeley, California Copyright 1980 pp. 10–2 and 10–3.

"AT&T UNIX Microsystem", *WE 32106 Math Acceleration Unit Information Manual*, Select Code 307–734, Nov. 1986 pp. 1–1 through 1–4, 2–24 through 2–27, 4–1 through 4–4, 4–8 through 4–10, 4–14, 4–19, and 4–22.

"TMS320C50 DSP", *Texas Instruments Preview Bulletin*.
"DSP 16 Architecture", *AT&T WE DSP16 Digital Signal Processor Information Manual*, pp. 2–1 through 2–16.
4 943 915 (N. C. Wilhelm et al.).
Compson Spring '89 Digest of Papers 3 Mar. 1989, San Francisco, CA, US pp. 13–17 G. Hinton, '80960–Next Generation.
I.E.E.E. Micro. vol. 9, No. 2, Apr. 1989, Los Alamitos, CA US pp. 26–38—C. Melear, The Design of the 88000 RISC Family.

*Primary Examiner*—Daniel H. Pan
*Attorney, Agent, or Firm*—Scott McLellan; David L. Smith

[57] ABSTRACT

An application-specific single chip digital processor having flexible design expansion capability with minimal impact on the performance of a processor core. The processor core has an ALU and a register file (accumulators). The output of the ALU is connected to a multiplexer whose output is connected to the input of the register file. The output of the register file connects to one input of the ALU. A function unit, separate from the core, has an input connected to the output of the register file and an output connected to another input to the multiplexer. The core operates with a predefined instruction set. The function unit, which may be redesigned depending on the application, operates with a reserved (uncommitted) instruction set under control of the core.

24 Claims, 2 Drawing Sheets

FLEXIBLE SINGLE CHIP DIGITAL PROCESSOR ARCHITECTURE

This application is a continuation of application Ser. No. 07/651,067, filed on Feb. 5, 1991, now abandoned.

BACKGROUND OF THE INVENTION

1. Field of the Invention

This invention relates to computer architecture in general, and more particularly, to digital processor architecture with expandable functionality for implementation on an integrated circuit.

2. Description of the Prior Art

Single chip digital processors, such as microcontrollers, microprocessors, or digital signal processors, are ubiquitous digital computers used in virtually every application where intelligent control, information processing, or real-time signal processing is important. The tasks a digital processor can efficiently fulfill are directly related to the internal organization, or architecture, of the processor. The more generalized the task(s), the more general the architecture. For example, the architecture of microprocessors, such as those used in personal computers, is more geared toward general information handling, compared to a microcontroller for a milling machine. Digital signal processors, or DSPs, are specialized digital computers. Unlike microprocessors, DSPs are adapted for efficient, often repetitive, processing of data. For example, a DSP may be used for filtering, detecting, and generating digitized analog signals in a modem. DSPs may also be used for processing signaling information from individual telephone lines and trunks in an electronic switching system. In either case, the task assigned to the DSP is specialized and repetitive—the faster the DSP can perform the assigned task, the greater the signal bandwidth that can be processed or the more telephone line signaling information that can be processed by one processor.

The architecture of a typical microprocessor has general purpose registers and arithmetic circuits arranged to process widely different tasks, such as text editing, spreadsheets, etc. As a consequence, the execution of those tasks are done not as quickly, or as efficiently, as a processor tailored for optimal performance of a particular task. A DSP, on the other hand, has specialized registers and arithmetic circuits for efficient processing of signals. For example, multiply-and-accumulate instructions are very common operations in signal processing algorithms and are usually implemented only in DSPs, not on microprocessors.

In certain applications, there is no commercially available microprocessor, microcontroller or DSP which can efficiently carry out a particular task in an efficient manner. An obvious solution is to design a new digital processor, or more likely a redesign of an old processor to add new functionality, which can efficiently carry out the desired task. However, this approach is expensive and time consuming. Further, adding new functionality to an existing processor may negatively impact the overall efficiency of the processor. For example, the addition of a new function to an existing microprocessor or DSP (i.e., new instructions and/ or additions to the processor's hardware) may slow down the execution speed of the processor's original instructions. Generally, this is not considered a good solution since the overall efficiency of the processor, with the added functionality, may be lowered.

Typical techniques to add new functionality to an existing processor include register, peripheral, or memory mapping of new hardware for the processor to access, or adding a co-processor. However, each of these techniques require the existing processor to access the additional hardware as a separate entity, slowing down the exchange of information between the processor and the added hardware. At best, the added hardware (typically a co-processor on a separate chip from the processor) "shadows" the existing processor's registers. The co-processor then takes over execution from the processor when specific instructions are addressed to it. Because a co-processor operates independently of the processor, the processor usually waits for the co-processor to finish execution, otherwise the processor and co-processor will lose synchronization and data may be lost. To move data between the processor and a co-processor, the data is usually read into temporary storage and reread under control the processor. This slows down the execution of the main processor, negating some of the advantage in speed gained by utilizing the co-processor.

It is, therefore, one aspect of the invention to provide a new digital processor architecture which allows for the addition of new functionality without significant impact on the existing, or core, functions of the processor.

It is another aspect of the invention to provide a digital processor architecture with expandable functionality which is readily integratable into a single chip using application specific integrated circuit technology.

SUMMARY OF THE INVENTION

These and other aspects of the invention are generally possible in a digital processor implementing common functions and application-specific functions, disposed in an integrated circuit, having a processor core for implementing the common functions and responsive to a first set of instructions. The processor core has a register file and an ALU, the input of the register file being coupled to the output of the ALU, and the output of the register file being coupled to the input of the ALU. The digital processor is characterized by: a function unit, implementing the application-specific functions and responsive to a second set of instructions, having an output and having an input coupled to the output of the register file; and, a selecting means, disposed between the output of the ALU and the input of the register file, for switching the input of the register file between the output of the ALU and the output of the function unit.

BRIEF DESCRIPTION OF THE DRAWING

The foregoing features of this invention, as well as the invention itself, may be more fully understood the following detailed description of the drawings, in which.

DETAILED DESCRIPTION

Figure 2:
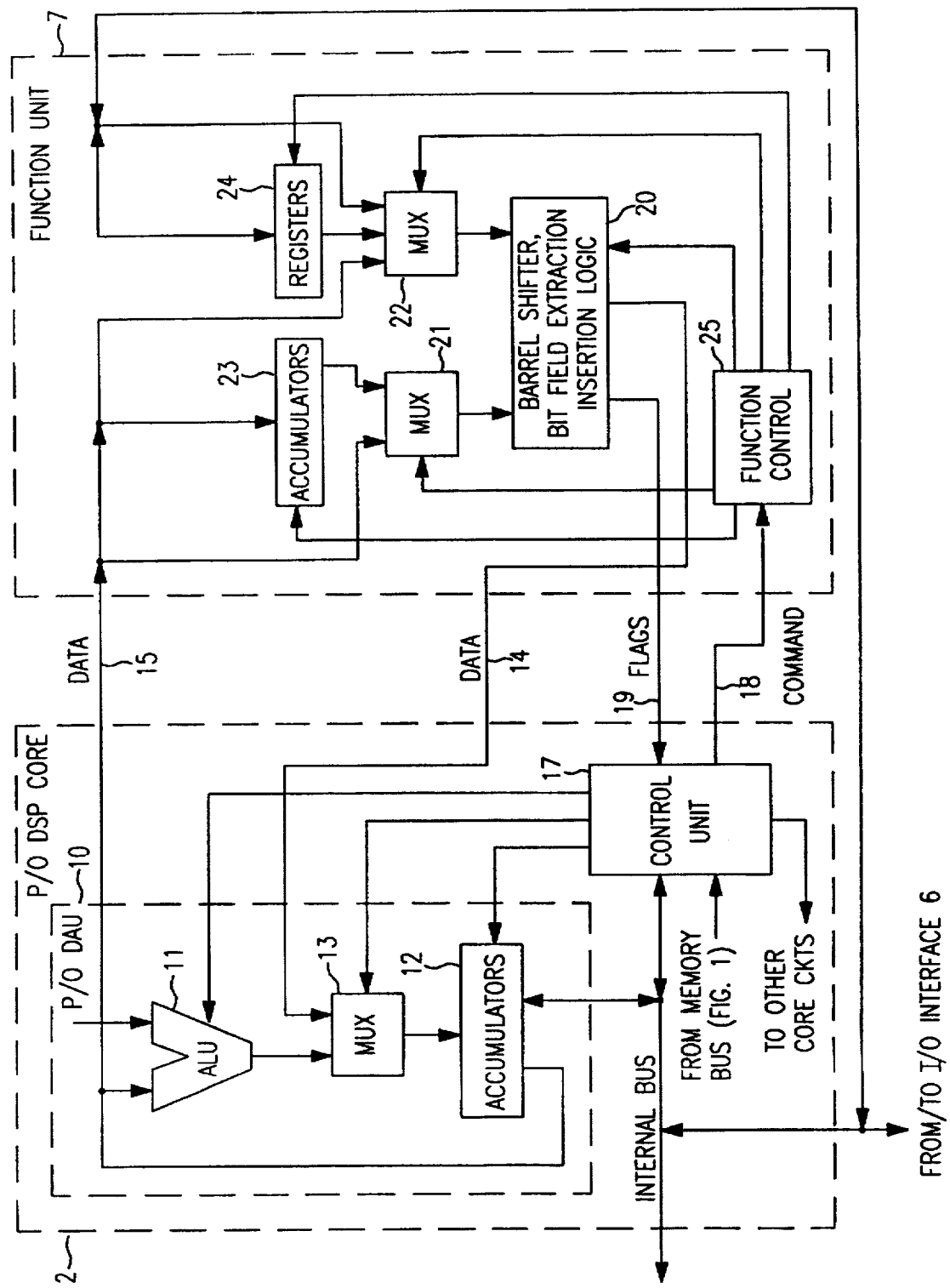

The invention may be generally understood by referring to the illustrative embodiment shown in FIG. 2. Here, a processor core 2 in a digital processor (not numbered) has therein a data processing unit 10 and a control unit 17. The control unit 17 responds to a predefined set of instructions for controlling the operation of the data processing unit 10. In the data processing unit 10, one input of an arithmetic logic unit (ALU) 11 couples to the output of a register file (accumulators) 12 and the input to the register file 12 couples to the output of the ALU 11. Added to the core 2 is a function unit 7, responsive to the control unit 17, having an input coupled to the output of the register file 12. Further, the data processing unit 10 includes a selecting means (multiplexer) 13, disposed between the output of the ALU and the input of the register file 12, for selecting as input to the register file 12 the output of the function unit 7 or the ALU 11. A portion of the instruction set of the digital processor pertains to the function unit 7 and the remaining portion of the instruction set is fixed and pertains to the processor core 2. Alternatively, the core 2 responds to a first set of instructions, which are usually predetermined or fixed. The function unit 7 responds to a second set of instructions which are dependent on the operations of the function unit 7.

Figure 1:
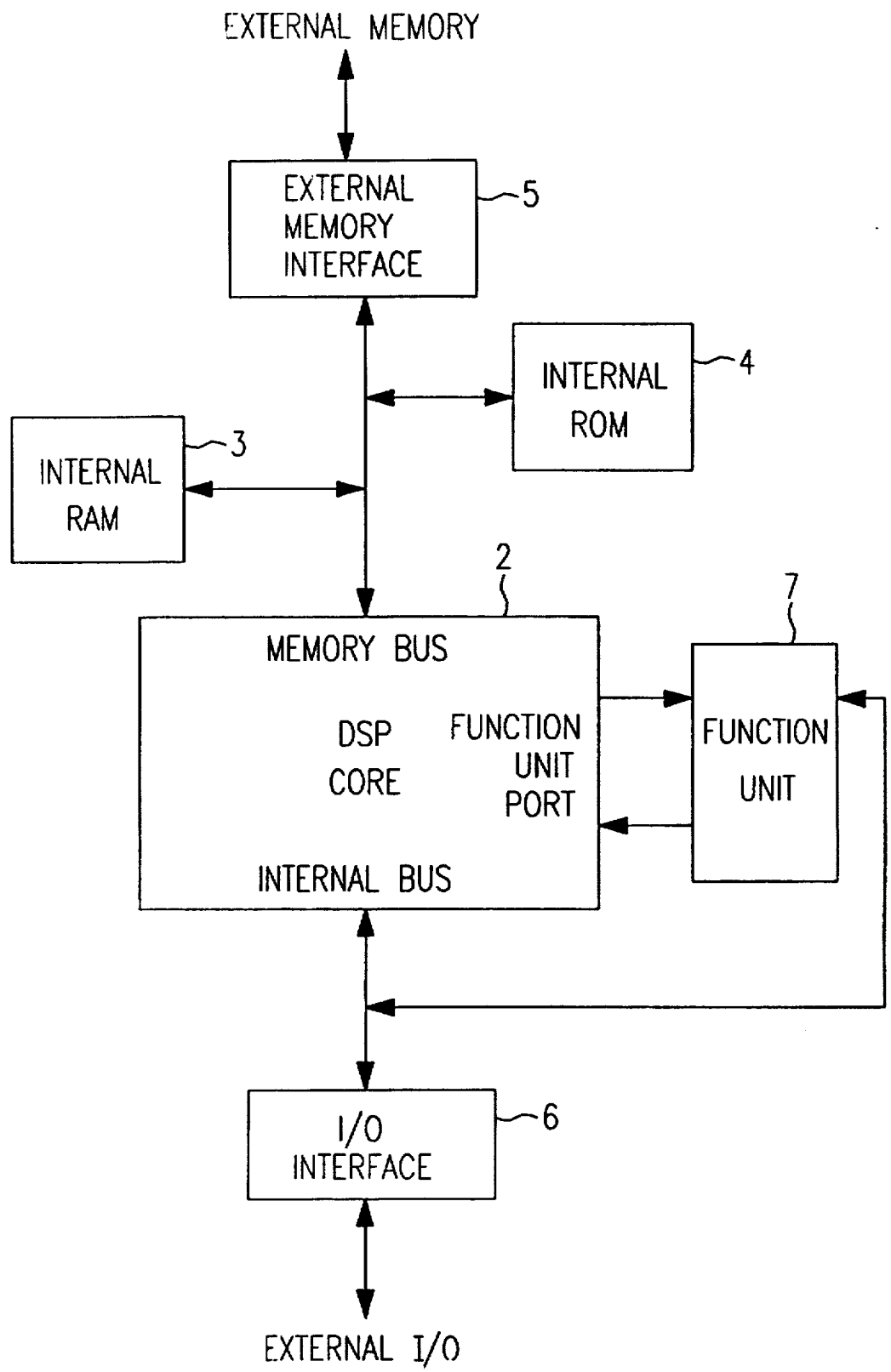
FIG. 1 is a simplified block diagram of an exemplary digital signal processor; and, FIG. 2 is a simplified block diagram showing in more detail the DSP core and function unit of the exemplary DSP in FIG. 1.

A more detailed explanation of the exemplary implementation of the above-described invention is given herein. In FIG. 1, an exemplary DSP 1, having a DSP core 2, is preferably integrated into a single IC. The DSP core 2 executes instructions from the internal RAM 3, internal ROM 4, or from the external memory (not shown) via interface 5. In addition, the DSP core 2 may communicate with external input/output (IO) devices, such as a digital-to-analog converter (not shown) via the I/O interface 6. Adding extra functionality to the DSP 1 is a function unit 7 which communicates with the DSP core 2 via a function unit port on the DSP core 2.

In addition, the function unit 7 may also communicate with the external IO devices through the I/O interface 6 for expedient data transfers.

It is understood that the DSP core 2 remains substantially the same regardless of the functions to be implemented by the function unit 7. With current application-specific integrated circuit (ASIC) design techniques the DSP 1, except the function unit 7 (and the coding in the ROM 4, if necessary), may be easily replicated for each species of DSP 1 desired. The function unit 7 for each DSP 1 species may then be designed from a library of circuit functions to implement the special function in an efficient manner or it may be designed in a full custom manner for higher performance and smaller chip area. This reduces the cost and time to design application specific DSPs for individual customers while giving them the advantages of a standardized DSP core 2. Hence, the customer can take advantage of common software tools to develop a system utilizing the DSP 1 while tailoring the DSP 1 to meet the specific requirements of the customer's system.

The specific implementation of the DSP core 2 and an exemplary function unit 7 for the exemplary DSP 1 is shown in FIG. 2. The DSP core 2 has a data/arithmetic unit (DAU) 10 (part of which is shown here) which has an arithmetic logic unit (ALU) 11 and a set of accumulators, or registers, 12. To interface the function unit 7 with the DSP core 2, a multiplexer 13 is added between the output of the ALU 11 and the accumulators 12. When data is to be loaded into the accumulators 12 from the function unit 7, the multiplexer is configured to take data from the function unit 7 via bus 14. For DSP core 2 operations not involving the function unit 7, the multiplexer 13 is configured to take data from the ALU 11. Data to the function unit 7 comes from the output of the accumulators 12 via bus 15. In this way, the function unit 7 is substituted for the ALU 11 when function unit 7 operations are desired. Note that there is no substantial impact on the performance of the DSP core 2 by the function unit 7 except for a small propagation delay for data through the multiplexer 13.

The exemplary function unit 7 shown here efficiently performs barrel shifts and bit field extraction/insertion in logic 20 for telephone signaling applications. Operation of the logic 20 is beyond what is necessary for the understanding of the claimed invention and will not be described further; the actual function and operation of the function unit 7 is shown here to illustrate the advantages arising from the invention. Briefly, multiplexers 21, 22 select data for the logic 20 either from the DSP core 2 via bus 15, from the internal bus, or from alternate accumulators 23 and registers 24. Data output from the function unit 7 is passed back to the core 2 via bus 14, through multiplexer 13, and stored in accumulators 12.

A control unit 17 receives instructions from the memories (3, 4, or external memory, FIG. 1) to control the DAU 10 (and other circuits not shown in the DSP core 2) and, indirectly, the function unit 7. In the preferred embodiment, the instructions to control the core 2 are predefined or fixed; except for a few specific instructions discussed below, the control unit 17 interprets the instructions for the core 2 independently of the function unit 7. Hence, the core 2 is a "fixed" design with the flexibility designed into the function unit 7.

The function unit 7 is controlled by function unit control 25, which is in turn controlled by control unit 17 in the core 2. Control unit 17 receives instructions for the function unit 7 and sends commands to the function unit control 25 to implement those instructions. The subset of instructions reserved for the function unit 7 typically have a reserved number of bits thereof, commonly known a bit field, which is passed to the function unit control 25 via the command bus 18.

As stated above, the instructions for the core 2 are predefined except for a few specific instructions. For example, on branch instructions, the branch condition may be dependent on a flag from the function unit 7. Hence, in the exemplary function unit 7 shown here, flag bits, such as a bit value, sign, error flags, etc., are sent back to the control unit 17 for processing via flag bus 19. In addition, certain instructions for moving data between the accumulators 12 and the function unit 7, such as those requiring the multiplexer 13 to be reconfigured, may vary depending on the circuitry in the function unit 7. For example, in the exemplary embodiment disclosed herein, the core 2 communicates with the function unit 7 by placing one or two words on the bus 15 and reading back on bus 14 one or two words. Between the exchange of words on buses 14, 15, the core 2 may wait one or two clock cycles for the function unit 7 to process data.

Although the exemplary digital processor shown in FIGS. 1 and 2 is a digital signal processor, the invention described above may be used in conjunction with any digital processor, such as a microprocessor or controller, where the advantages of flexible expansion of the processor are desired.

Having described the preferred embodiment of this invention, it will now be apparent to one of skill in the art that other embodiments incorporating its concept may be used. It is felt, therefore, that this invention should not be limited to the disclosed embodiment, but rather should be limited only by the spirit and scope of the appended claims.

We claim:

1. A digital processor, formed in an integrated circuit, having a processor core, the processor core comprising:

a control unit, responsive to a predetermined set of instructions;

a data processing unit, responsive to the control unit, having therein an ALU and a register file, an input of the ALU coupled to an output of the register file and an output of the ALU coupled to an input of the register file;

a function unit, responsive to the control unit, having an input coupled to an output of the register file and an output;

means for sending flag bits from the function unit to the control unit for processing; and a selecting means responsive to the control unit, disposed between the output of the ALU and the input of the register file, for receiving the output of the ALU and the output of the function unit, and for selecting as input to the register file the output of the ALU or the output of the function unit;

wherein a portion of the instruction set pertains to the function unit and the remaining portion of the instruction set is predefined and pertains to the processor core.

2. The digital processor as recited in claim 1, wherein the register file and the selecting means are also responsive to the control unit.

3. The digital processor as recited in claim 2, wherein the function unit includes a controller, responsive to the control unit in the processor core, for controlling the operation of the function unit.

4. The digital processor as recited in claim 3, wherein the selecting means is a multiplexer.

5. The digital processor as recited in claim 4, wherein the register file has one or more registers.

6. A digital processor implementing common functions and application-specific functions, disposed in an integrated circuit, having:

a processor core, implementing the common functions and responsive to a first set of instructions, having a register file and an ALU, the input to the register file being coupled to the output of the ALU and the output of the register file being coupled to an input of the ALU, wherein the processor core additionally has a control unit, responsive to the second set of instructions, the ALU and register file being responsive to the control unit;

a function unit, implementing the application-specific functions and responsive to a second set of instructions, having an input coupled to the output of the register file, and having an output;

means for sending flag bits from the function unit to the processor core for processing; and a selecting means responsive to the processor core, disposed between the output of the ALU and the input of the register file, for receiving the output of the ALU and the output of the function unit, and for switching the input of the register file between the output of the ALU and the output of the function unit, the function unit and the selecting means being responsive to the control unit, the control unit being additionally responsive to the second set of instructions.

7. The digital processor as recited in claim 6, wherein the function unit includes a controller, responsive to the control unit in the processor core, for controlling the operation of the function unit.

8. A digital processor having a processor core formed in an integrated circuit, wherein the digital processor and processor core are formed in a single integrated circuit the processor core comprising:

a control unit, responsive to a predetermined set of instructions;

a data processing unit, responsive to the control unit, having therein an ALU and a register file, an input of the ALU coupled to the output of the register file and the output of the ALU coupled to the input of the register file;

a function unit, responsive to the control unit, having an input coupled to the output of the register file, and an output;

means for sending flag bits from the function unit to the control unit for processing; and a selecting means responsive to the control unit, disposed between the output of the ALU and the input of the register file, for receiving the output of the ALU and the output of the function unit, and for selecting as input to the register file the output of the ALU or the output of the function unit;

wherein a portion of the instruction set pertains to the function unit and the remaining portion of the instruction set is predefined and pertains to the processor core.

9. A digital processor having a processor core formed in an integrated circuit, the processor core comprising:

a control unit, responsive to a predetermined set of instructions;

a data processing unit, responsive to the control unit, having therein an ALU and a register file, an input of the ALU coupled to the output of the register file and the output of the ALU coupled to the input of the register file, wherein the register file is also responsive to the control unit;

a function unit, responsive to the control unit, having an input coupled to the output of the register file, and an output;

means for sending flag bits from the function unit to the control unit for processing; and a selecting means responsive to the control unit, disposed between the output of the ALU and the input of the register file, for receiving the output of the ALU and the output of the function unit, and for selecting as input to the register file the output of the ALU or the output of the function unit;

wherein a portion of the instruction set pertains to the function unit and the remaining portion of the instruction set is predefined and pertains to the processor core.

10. The digital processor as recited in claim 9, wherein the function unit includes a controller, responsive to the control unit in the processor core, for controlling the operation of the function unit.

11. The digital processor as recited in claim 10, wherein the selecting means is a multiplexer.

12. The digital processor as recited in claim 11, wherein the register file has one or more registers.

13. A method of processing data in an application specific digital processor having a control unit responsive to a predetermined set of instructions, and a data processing unit responsive to the control unit, the data processing unit including an arithmetic logic unit (ALU) and a register file, an input of the ALU coupled to an output of the register file and an output of the ALU coupled to the input of the register file to define a basic data path, the application specific digital processor also having a function unit responsive to the control unit, the function unit having an input coupled to the output of the register file, the function unit having an output coupled to the input of the register file through selecting means, the selecting means for selecting as input to the register file the output of the ALU or the output of the function unit, the method comprising the steps of:

receiving instructions to control the data processing unit, and indirectly the function unit;

interpreting the instructions to determine a portion of the instruction set that pertains to the data processing unit and a portion that pertains to the function unit; and substituting the function unit in the basic data path for the ALU when instructions indicate operation of the function unit is desired, whereby the function unit is adapted to provide efficient specialized data manipulation in approximately the same number of clock cycles as the data processing unit requires to execute instructions.

14. A method as recited in claim 13, wherein operation of the function unit occurs in a predefined number of clock cycles.

15. A method as recited in claim 13, further comprising the step of implementing common functions in the data processing unit responsive to a first set of instructions.

16. A method as recited in claim 13, further comprising the step of suspending operation of the data processing unit while the function unit operates.

17. A method as recited in claim 13, further comprising the step of providing data to the function unit by a bus coupled to the register file.

18. A method as recited in claim 13, further comprising the step of providing communication between the function unit and external input-output devices.

19. A method as recited in claim 13, further comprising the step of loading data from the function unit into a register file.

20. A method as recited in claim 13, further comprising the step of transferring data from a register file to the function unit for processing.

21. A method as recited in claim 20, further comprising the step of loading data from the function unit into the register file.

22. A method of processing data in an application specific digital processor having a control unit responsive to a predetermined set of instructions, and a data processing unit responsive to the control unit, the data processing unit including an arithmetic logic unit (ALU) and a register file, an input of the ALU coupled to an output of the register file and an output of the ALU coupled to the input of the register file to define a basic data path, the application specific digital processor also having a function unit responsive to the control unit, the function unit having an input coupled to the output of the register file, the function unit having an output coupled to the input of the register file through selecting means, the selecting means for selecting as input to the register file the output of the ALU or the output of the function unit, the method comprising the steps of:

receiving instructions to control the data processing unit, and indirectly the function unit;

interpreting the instructions to determine a portion of the instruction set that pertains to the data processing unit and a portion that pertains to the function unit;

substituting the function unit in the basic data path for the ALU when instructions indicate operation of the function unit is desired, whereby the function unit is adapted to provide efficient specialized data manipulation in approximately the same number of clock cycles as the data processing unit requires to execute instructions; and implementing application specific functions in the function unit responsive to a second set of instructions.

23. A method of designing an application specific digital processor, comprising:

designing a general purpose digital processor core having a data path including an arithmetic logic unit (ALU) and a register file in which an input of the ALU is coupled to an output of the register file and an output of the ALU is capable of being selectively coupled to an input of the register file, the digital processor core including a control unit responsive to a predetermined first portion of an instruction set, the digital processor core including a communication channel to couple a circuit to the core; and designing a function unit to implement a special function more efficiently than a general purpose digital processor, the function unit capable of being responsive to a second portion of the instruction set, the special function implementable with the digital processor core and controllable using a second portion of the instruction set, the function unit capable of being selectively substituted for the ALU when the second portion of the instruction set indicates operation of the function unit is desired, the function unit coupled to the digital processor core by the communication channel, the communication channel capable of selectively coupling the output of the register file to the input of the function unit, and the output of the function unit to the input of the register file, when the function unit is substituted in the data path for the ALU.

24. An application specific digital processor, comprising:

a general purpose digital processor core formed in an integrated circuit, the digital processor core including a control unit responsive to a predetermined set of instructions, the digital processor core having a data path including an arithmetic logic unit (ALU) having an input and an output and a register file having an input and an output, an input of the ALU coupled to the output of the register file and the output of the ALU is capable of being selectively coupled to the input of the register file by a selecting means, the digital processor core including a control unit responsive to a predetermined first portion of the instruction set, the digital processor core including a communication channel adapted to interconnect the digital processor core with a function unit adapted to implement a special function more efficiently than the general purpose digital processor core, the function unit responsive to a second portion of the instruction set, the communication channel capable of selectively coupling the output of the register file to the input of the function unit, and the output of the function unit to the input of the register file when the function unit is substituted in the data path for the ALU, whereby the second portion of the instruction set is adapted to be used without modification by any of a library of function units implementing various special functions, or a subsequently developed function unit implementing a special function not presently available in the library of function units.

* * * * *